US012243663B2

(12) United States Patent
Stengel et al.

(10) Patent No.: US 12,243,663 B2
(45) Date of Patent: Mar. 4, 2025

(54) CONTAINER FOR LOW-TO-HIGH LEVEL LONG-LIVED RADIOACTIVE WASTE

(71) Applicant: GLOBAL TELE MARKETING GTM SA, Geneva (CH)

(72) Inventors: Patrice Stengel, Geneva (CH); Mark Kettner, Schriesheim (DE); Pierre De Loës, Vandoeuvres (CH)

(73) Assignee: GLOBAL TELE MARKETING GTM SA, Geneva (CH)

( * ) Notice: Subject to any disclaimer, the term of this patent is extended or adjusted under 35 U.S.C. 154(b) by 446 days.

(21) Appl. No.: 17/844,156

(22) Filed: Jun. 20, 2022

(65) Prior Publication Data

US 2022/0319728 A1 Oct. 6, 2022

Related U.S. Application Data

(63) Continuation-in-part of application No. 16/603,414, filed as application No. PCT/EP2018/058753 on Apr. 5, 2018, now Pat. No. 11,367,538.

(30) Foreign Application Priority Data

Apr. 7, 2017 (LU) .................................. LU100166

(51) Int. Cl.
*G21F 5/008* (2006.01)
*G21F 5/08* (2006.01)
*G21F 5/12* (2006.01)

(52) U.S. Cl.
CPC ................ *G21F 5/008* (2013.01); *G21F 5/08* (2013.01); *G21F 5/12* (2013.01)

(58) Field of Classification Search
CPC . G21F 5/00; G21F 5/002; G21F 5/005; G21F 5/008; G21F 5/012; G21F 5/015;
(Continued)

(56) References Cited

U.S. PATENT DOCUMENTS 3,754,141 A 8/1973 Leebl et al.
4,277,688 A 7/1981 Yamamoto et al.
(Continued)

FOREIGN PATENT DOCUMENTS

CN 101971267 A 2/2011
CN 201904094 U 7/2011
(Continued)

OTHER PUBLICATIONS

Chinese Office Action for Chinese Application No. 201880033152.8, dated Feb. 28, 2023, 11 pages.
(Continued)

*Primary Examiner* — Jason L McCormack
(74) *Attorney, Agent, or Firm* — CANTOR COLBURN LLP

(57) ABSTRACT

A radiation and impact-protected radioactive waste cask, comprising a container for radioactive waste including an outer steel wall, an inner steel wall, a layer of lead located between the two steel walls, a steel base, a steel cover, a volume of quartz sand located inside the container, at least one internal vessel that is surrounded at least partially by the volume of quartz sand; and radioactive waste located inside the receptacle, wherein the radiation and impact-protected radioactive waste cask further comprises a removable outer transportation canister, wherein the removable outer transportation canister comprises a hollow cylindrical or polygonal body with a lower end and an upper end, configured for fittingly receiving therein the container for radioactive waste, wherein the lower end is closed by a fixed bottom and the upper is closed with a removable canister cover, wherein the hollow cylindrical or polygonal body, the fixed bottom and the removable canister cover are made of at least three layers, an outer layer made of armor grade steel, an inner layer made of high strength steel, and an intermediate layer
(Continued)

between said outer and inner layers, said intermediate layer being made of one or more strati comprising ceramic material, wherein said ceramic material is selected from oxide ceramics, non-oxide ceramics and mixtures thereof.

11 Claims, 2 Drawing Sheets

(58) Field of Classification Search
CPC ..... G21F 1/00; G21F 1/02; G21F 1/04; G21F 1/047; G21F 1/08; G21F 1/12
USPC ........................................................ 250/506.1
See application file for complete search history.

(56) References Cited

U.S. PATENT DOCUMENTS

| | | | | |
|---|---|---|---|---|
| 4,366,095 | A | 12/1982 | Takats et al. | |
| 4,535,250 | A | 8/1985 | Fields | |
| 4,666,659 | A * | 5/1987 | Lusk | G21F 5/008 976/DIG. 344 |
| 4,935,943 | A * | 6/1990 | Schweitzer | G21F 5/00 250/507.1 |
| 2008/0031396 | A1 | 2/2008 | Singh et al. | |
| 2010/0272225 | A1 | 10/2010 | Singh | |
| 2015/0243394 | A1 | 8/2015 | Farmer et al. | |
| 2016/0012926 | A1 * | 1/2016 | Lehnert | G21F 5/06 250/506.1 |
| 2016/0196887 | A1 * | 7/2016 | Singh | G21F 5/008 220/592.01 |
| 2018/0122527 | A1 | 5/2018 | Singh et al. | |
| 2020/0273591 | A1 | 8/2020 | Muller | |

FOREIGN PATENT DOCUMENTS

| | | | |
|---|---|---|---|
| CN | 104575648 | A | 4/2015 |
| FR | 2465298 | A1 | 3/1981 |
| GB | 1222189 | A | 2/1971 |
| WO | 2011026976 | A1 | 3/2011 |

OTHER PUBLICATIONS

International Search Report issued Jun. 29, 2018 re: Application No. PCT/EP2018/058753; pp. 1-2; citing: US 4 935 943 A, FR 2 465 298 A1 and US 3 754 141 A.

* cited by examiner

CONTAINER FOR LOW-TO-HIGH LEVEL LONG-LIVED RADIOACTIVE WASTE

CROSS REFERENCE TO RELATED APPLICATIONS

This application is a continuation-in-part of and claims priority under 35 U.S.C. § 120 to U.S. patent application Ser. No. 16/603,414, filed on Oct. 7, 2019, which is a National Stage Entry entitled to and hereby claims priority under 35 U.S.C. § 371 to corresponding International Patent Application No. PCT/EP2018/058753, filed on Apr. 5, 2018, which, in turn, claims priority to Luxembourg Patent Application Serial No. LU100166, filed on Apr. 7, 2017. The entire contents of the aforementioned applications are herein expressly incorporated by reference.

TECHNICAL FIELD

The present disclosure relates to the field of storing long-lived radioactive waste. More specifically, the present disclosure relates to a container for storing low-to-high level long-lived radioactive waste.

BACKGROUND

Radioactive waste is any radioactive material that can no longer be recycled or reused by humans.

Nuclear waste has very different origins and natures. These are, for example, elements contained in the spent fuel of nuclear power plants, except uranium and plutonium contained therein, radioactive elements for medical or industrial use, or materials brought into contact with radioactive elements.

Two parameters make it possible to grasp the risk that they present:

Radioactivity reflects the toxicity of the waste, including its potential impact on humans and the environment.

The lifespan helps define the duration of potential harm.

90% of radioactive waste is low level short-lived radioactive waste. The choice and management style was made decades ago by setting up surface storage centers on an industrial scale.

For the remaining 10%, the medium-to-high level long-lived radioactive waste, the choice of a long-term management style has not yet been made. It is now industrially stored on the surface, safely and for several decades, in specially constructed buildings at their production sites.

Waste management is defined as follows:

Advanced separation and transmutation of waste with the aim of sorting and transforming certain long-lived waste into other, less toxic and shorter-lived waste. This reduces the long-term harmfulness of waste.

Storage in deep geological formation with the aim of developing underground storage devices and technologies, focusing on concepts allowing for reversibility.

Long-term surface and subsurface packaging and storage processes, the aim of which is to develop radioactive waste packaging and its long-term storage conditions, ensuring the protection of humans and the environment with complementary solutions to those already existing, making it possible to further safeguard the waste.

The classification of radioactive waste is done according to two criteria.

a) Their activity is the number of nuclear disintegration that occur every second within them. The activity is measured in in becquerels (1 Bq=1 disintegration per second) for a mass of 1 kg of the substance.

Here are some examples:

1 kg of rainwater: around 1 Bq (natural radioactivity)

1 kg of granitic soil: around 10,000 Bq (natural radioactivity)

1 kg of uranium ore: around $10^5$ Bq (natural radioactivity)

1 kg of spent fuel just discharged *: of the order of $10^{14}$ Bq.

* Activity decreases with time. After 10 years, fuel activity decreased by a factor of about 6.

b) Their period of radioactive decay or, in short, their "period", which is by definition the time necessary for the substance activity to halve.

The half-life does not depend on the mass of material considered. Each pure radionuclide has a perfectly known period, its value can range from less than one thousandth of a second (for example polonium 214: 0.16 ms) to several billion years (for example uranium 238: 4.5 billion years) through all intermediate values (iodine 131: 5 days, cesium 137: 30 years, plutonium 239: 24,000 years, uranium 235: 7 million years, etc.).

If the substance is mixed, the longest of all the radionuclides present is taken as the value for the radioactivity period.

A radionuclide is transformed, by disintegration, into another nucleus known as the "progeny"; either this parent nucleus is stable, or it is also radioactive and disintegrates in turn . . . and so on until a stable nucleus forms.

An initial short life nucleus may very well have long life progenies. It is then the period of these that we retain.

From two criteria, "activity" and "period", the classification following the activity reflects the technical precautions that it is necessary to take in terms of radiation protection; the ranking according to the period reflects the duration of the harm Regarding the activity criterion, waste is said to have:

"very low activity" if its activity level is less than one hundred becquerels per gram (order of magnitude of natural radioactivity)

"low activity" if its activity level is between a few tens of becquerels per gram and a few hundred thousand becquerels per gram and its content in radionuclides is low enough not to require protection during normal handling and transport operations.

"average activity" if its activity level is about one million to one billion becquerels per gram (1 MBq/gr at & GBq/gr).

"high activity" if its level of activity is of the order of several billion becquerels per gram (GB/gr), the level for which the specific power is of the order of a watt per kilogram, hence the designation of "hot" waste.

Regarding the period criterion, waste is said to have:

a "very short life", if its period is less than 100 days, (which allows it to be managed by radioactive decay, to be treated after a few years as normal industrial waste).

a "short life", if its radioactivity comes mainly from radionuclides that have a period of less than 31 years (which ensures its disappearance on a historical scale of a few centuries)

a "long life", if it contains a large quantity of radionuclides with a period greater than 31 years (which requires containment and dilution management compatible with geological time scales)

In general, after ten times the half-life of a radionuclide, its activity has been divided by 1024, which enables it move from one activity category to another. So, after 310 years, "medium level short-lived" waste becomes no more than "low level short-lived", and three additional centuries will make it fall into the "very low activity" category.

Other classification criteria involve chemical risks and the physicochemical nature of the waste. Radioisotopes will be all the more dangerous because they are highly radioactive, have chemical toxicity, and can easily transfer into the environment.

Radioactive waste that requires elaborate and specific protection measures is high level long-lived (HLLL waste). The activity of this waste is usually sufficient to cause burns if you stay exposed too long.

HLLL waste is mainly derived from spent fuel from nuclear power plants.

For convenience, and due to the seriousness of the consequences of high level waste for humans, it could now be imposed, according to the precautionary principle, to base the radiation protection of this high level waste on geological containment devices. This radioactive waste would be stored in a deep geological layer and in a permanent way. However, although its radioactivity remains significant for hundreds of thousands, even millions, of years, this would be the case without counting on the fact that this waste will be transformed over time into "low level long-lived" waste so no longer imposing this precaution. Moreover, nothing to date can guarantee the sealing of containers, whatever they are, as well as rock stability over such long periods. As a result, radioactivity would inevitably rise to the surface by uncontrollably contaminating vital elements (water, soil, etc.) over very large areas.

The alternative option of storing HLLL waste "underground" i.e. at depths, for example, not exceeding 5 m underground, and in monitored locations, allows easy access to waste in the case of future recycling.

In any case, further risks must be considered.

One such risk is linked to the fact that radioactive waste is generally not stored where it is produced. This means that the waste must be transported from its initial location ideally directly to its final storage location, but more often the transport implies more than one stopover before the waste arrives at its destination. While transporting as such already encompasses risks, such as transport accidents, such as collisions, derailments and similar incidents, further threads are present, such as notably fire.

A still further risk, mainly during transportation, but also during temporary or even underground storage at reduced depths, is the potential attack by terrorists with the intention to cause or at least to accept a radioactive contamination of a more or less important area in the pursuit of their political aims. Again, resulting fires may have a further impact on the overall casualties.

In the alternative option of long-term storage underground, one must take into account the risks that natural elements may have on the storage means used.

Fire is an extremely destructive natural element, and the means of storing HLLL waste underground must be able to withstand it, at least temporarily.

The WO 2011/026976 document discloses a package of radioactive waste comprising two layers covering the waste. The package comprises: an outer layer comprising a mixture of liquefied micronized plastics and a micronized iron oxide powder; an inner layer of vitrified materials. The outer layer is 2-3 mm. The outer layer absorbs rays coming from the outside. The package may also include an additional plastic coating to protect against water. The outer layer is resistant to radiation and heat, but it certainly does not resist firing.

Steel storage tanks are also known and widely available on the market in various forms. The tanks often used for long-term storage comprise a bottom, an outer wall, and a lid, as well as means for closing the lid on the outer wall. An internal lead wall blocks some of the gamma radiation from the waste. Such tanks, however, do not withstand high temperatures.

BRIEF SUMMARY

An aim of the present disclosure is to still further increase the security of a radioactive waste container, more particularly to increase its resistance to mechanical damage of any type, but especially due to impacts especially during transport, in preparation for its storage on the surface or underground and the associated fire risk.

According to the disclosure, this is achieved by a radiation and impact-protected radioactive waste cask, comprising a radioactive waste container comprising a steel outer wall, a steel inner wall, a lead layer located between the two steel walls, a steel bottom, a steel lid, a volume of quartz sand located inside the container, at least one inner vessel/cassette/inner box coated encircled covered at least partially covered by the volume of quartz sand and radioactive waste located inside the container, wherein the radiation and impact-protected radioactive waste cask (at least temporarily) further comprises a removable outer transportation canister, wherein the removable outer transportation canister comprises a hollow cylindrical or polygonal body with a lower end and an upper end, configured for fittingly receiving therein the radioactive waste container, wherein the lower end is closed by a fixed bottom and the upper is closed with a removable canister cover, wherein the hollow cylindrical or polygonal body, the fixed bottom and the removable canister cover are made of at least three layers, an outer layer made of armor grade steel, preferably having a thickness of at least 15 mm, an inner layer made of high strength steel, preferably having a thickness of at least 35 mm, and an intermediate layer between said outer and inner layers, preferably having a thickness of at least 25 mm, said intermediate layer being made of one or more strati comprising or consisting of ceramic material, wherein said ceramic material is selected from oxide ceramics, non-oxide ceramics and mixtures thereof.

To facilitate the correct placement of the radioactive waste storage container within the removable outer transportation canister, the bottom of the removable outer transportation canister may comprise positioning blocks. Advantageously said positioning blocks have a tapered shape opening to their upper side so as to self-center the radioactive waste storage container when it is lowered into place. These positioning blocks may also provide for holding in place the radioactive waste storage container once it is fully inserted into the transportation canister. Similar centering blocks may be provided at appropriate locations on the inner side of the canister's hollow cylindrical or polygonal body or alternatively on the outer circumference of the radioactive waste storage container.

In preferred embodiments, the radioactive waste storage container can be further secured by at least partially, preferably entirely, filling up any void within the hollow cylindrical or polygonal body of the removable outer transportation canister and radioactive waste storage container with quartz sand. This volume of quartz sand does not only help in avoiding any movement of the radioactive waste storage container during transport, but further enhances the resistance to mechanical stresses and its resistance to fire.

Armor grade steels (also sometimes called military grade steels or ballistic steels), that can be used for the outer layer of the outer transportation canister, generally have a maximum carbon contents by weight of 0.32%. However, the focus is clearly on their hardness. Simply defined, their hardness, represented by the Brinell Hardness, is calculated by comparing the amount of applied force on a piece of material to the size of the indentation of the force. More specifically, the Brinell hardness test consists of applying a constant load, usually in the range 500-3000 N, for a specified period of time (10-30 s) using e.g. a 5 or 10 mm diameter hardened steel or tungsten carbide ball on the flat surface of a work piece. According to ISO 6506-1:2014, the Brinell hardness (HBW, using a tungsten carbide ball) expressed in MPa is then obtained as:

$$HBW=0.102*2F/\{\pi D[D-(D^2-d^2)^{1/2}]\}$$

where D is the ball diameter (mm), d is the diameter of the resultant, recovered circular indentation (mm) and P is the applied load (kg). Hence, the HB is obtained by dividing the applied load by the surface area of the indentation and not the projected area.

The armor grade steel for the outer layer of the outer transportation canister preferably has a Brinell Hardness, HBW, of at least 3900 MPa according to ISO 6506-1:2014. Appropriate armor grade steels are e.g. A36, AR400, AR500, MIL-46100, MIL-12560 or MIL-46177. While the outer layer is preferably made of one sheet of appropriate thickness, it may comprise two or more superposed (thinner) armor grade steel sheets, if deemed necessary or desirable.

The high strength steel of the inner layer generally has a Brinell Hardness, HBW, of between 2450 and 3675 MPa according to ISO 6506-1:2014. Appropriate high strength steels are generally steels having a yield strength ranging between 210-550 MPa and a tensile strength between 270 to 700 MPa. In the context of the present disclosure, the term "high strength steel" thus includes steels with yield levels higher than 550 MPa which are generally designated advanced high strength steels, and which when their tensile strength levels exceed 780 MPa, are usually referred to as ultra-high strength steels. Again, while the inner layer is preferably made of one thick sheet, it may comprise two or more thinner, superposed high strength steel sheets if deemed necessary or desirable.

The intermediate layer may comprise two or more strati, each comprising or consisting of ceramic material, such as e.g. alumina, boron carbide, and/or silicon carbide, with a backing of a ductile fiber reinforced layer or a metal leaf, most preferably the ductile fibers are weaved para-aramid fibers, such as poly-(para-phenylene terephthalamide), e.g. Kevlar®, Twaron®, etc. Kevler® K-29, K49, K119, K129, K149, AP, XP or KM2, or combinations thereof are examples of appropriate para-aramid fibers. If the backing(s) within the intermediate layer is/are metal leaves, they may be made of similar materials as the outer or the inner layer, i.e. armor grade steel, high strength steel or even a mild steel grade as used for the radioactive waste storage container. In case of two or more strati, these are preferably positioned such that any joints between adjoining element within one stratum are placed in a staggered fashion with any element of the below or above strati.

The present disclosure also describes, in a still further aspect, a method for further temporary protection of a container for radioactive, preferably a radioactive waste storage container as defined herein, from mechanical damage during transport and storage, such as impacts in case of a drop from a certain elevation, in case of accident during transport, against explosions resulting e.g. from a nearby fire or even against intentional damage in case of armed attacks, etc., thereby providing a radiation and impact-protected radioactive waste cask, the method comprising: providing an outer transportation canister comprising a hollow cylindrical or polygonal body with a lower end and an upper end, configured for fittingly receiving therein the radioactive waste storage container, wherein the lower end is closed by a fixed bottom and the upper is closed with a removable canister cover, wherein the hollow cylindrical or polygonal body, the fixed bottom and the removable canister cover are made of at least three layers, an outer layer made of armor grade steel, preferably having a thickness of at least 15 mm, an inner layer made of high strength steel, preferably having a thickness of at least 35 mm, and an intermediate layer between said outer and inner layers, preferably having a thickness of at least 25 mm, wherein said intermediate layer is made of one or more strati comprising or consisting of ceramic material, wherein said ceramic material is selected from oxide ceramics, non-oxide ceramics and mixtures thereof; placing the radioactive waste container inside said radioactive waste transportation canister, optionally filling up any void left within the radioactive waste transportation canister with quartz sand, and sealing the radioactive waste transportation canister by firmly closing the canister cover.

As the radioactive waste transportation canister will primarily be used during transport or even during temporary storage in facilities at the ground or at reduced depth below the ground, i.e. while the risk of mechanical stress cannot be ruled out, a still further aspect of the disclosure is a kit-of-parts comprising a first number of radioactive waste storage containers as described herein and a second number of outer transportation canisters as disclosed herein, wherein the first number is greater than the second number. Indeed, when the radiation and impact-protected radioactive waste casks including outer radioactive waste transportation canisters arrive at their final destination, such as in a deep geological disposal location, the radioactive waste storage containers can be removed from the radioactive waste transportation canister and stored and their radioactive waste transportation canisters can be reused for safely transporting further radioactive waste transportation canisters.

Fire safety products must demonstrate a reaction to fire (not flammable) and fire resistance (stability for a period of time). Steel does not ignite and the fire resistance of a steel wall will increase with its thickness. In the present disclosure, the container comprises, like the existing tanks, an outer wall and a layer of lead. It is distinguished by an inner steel wall in contact on one side with the lead layer and on the other side with a layer of quartz sand, itself in contact with the vessel wall. Confining the lead in the space between the double wall steel ensures good radiation protection, even at temperatures above the melting point of lead.

The quartz sand layer and lead layer will enhance resistance to high temperatures and will ensure the integrity of the container even at very high temperatures.

This surprising effect comes from the fact that lead and quartz sand, sandwiched between the outer and inner steel walls and the inner wall and the wall of the vessel, will slowly melt, absorbing a large supply of heat energy. The temperature of the layer of lead, respectively of sand, partly in fusion, partly in solid state, will not rise above the melting temperature of lead, respectively of quartz sand, as long as it remains in solid state. There will be two temperature levels, the first at the lead melting temperature and the second at the quartz sand melting temperature.

As a result, the lead layer and the quartz sand layer will increase the temperature resistance and will ensure the integrity of the container, even at very high temperatures, for a period of time.

Lead, according to its purity, has a melting temperature of about 320° C. and a boiling temperature of about 1700° C. The quartz sands according to their purity have a melting temperature of 1300-1600° C. and a boiling temperature of the order of 2000° C.

According to an advantageous mode of the disclosure, the lead layer is of a thickness of between 25 mm and 50 mm. The layer of quartz sand between the container and the inner steel wall preferably has a thickness of at least 2 cm, preferably at least 3 cm. The maximum thickness of the sand layer is preferably less than 10 cm, more preferably less than 8 cm and in particular less than 6 cm.

According to an advantageous mode of realization, the outer wall comprises a pressure relief valve. The valve will allow for the evacuation of gases from the melting/boiling of the lead contained in the space between the double steel wall.

The inner vessel is preferably stainless steel. The stainless steel inner vessel will not melt until a melting temperature of 1535° C.

The stainless steel inner vessel may contain low level radioactive waste.

According to another preferred mode of realization, the inner vessel is ceramic. The ceramic inner vessel is very interesting for its resistance at a temperature of 1400° C.

The ceramic inner vessel may contain high level radioactive waste.

According to an advantageous mode of realization, the lid comprises a steel outer wall, a steel inner wall and a layer of lead contained between the two steel walls. According to a mode of realization, the bottom comprises a steel outer wall, a steel inner wall and a layer of lead contained between the two steel walls. The lid and, if necessary, the bottom, so produced, can block a portion of gamma radiation waste.

The inner vessel may include a removable cap. The inner vessel with the cap will completely isolate the radioactive waste.

The container may comprise an inner rack with one or more compartments, the vessel/s to be positioned in said inner rack. The rack facilitates the arrangement of several vessels inside the container. The interior rack may include one or more doors, providing easy access to the compartment/s.

Inner rack preferably comprises one or more centering means and/or one or more gripping means. In addition, the interior rack may include one or more holes to allow the sand to fill the space between the vessels and the rack.

According to another preferred mode of realization, the steel is stainless steel, preferably type 316L steel. The composition of stainless steels may alternatively be that of other stainless steels used in the nuclear industry or also in other industries, for example in the marine field or in the field of secured home closures.

According to an advantageous mode of realization, the container further comprises a layer of plastics coating the radioactive waste in the inner container. The plastic layer blocks an additional portion of the radioactive radiation.

The container preferably comprises an outer rubber envelope covering the outer wall.

BRIEF DESCRIPTION OF THE DRAWINGS

Other peculiarities and characteristics of the disclosure will become apparent from the detailed description of some advantageous modes of realization presented below, by way of illustration, with reference to the accompanying drawings. These show.

DETAILED DESCRIPTION OF THE DRAWINGS

Figure 1:
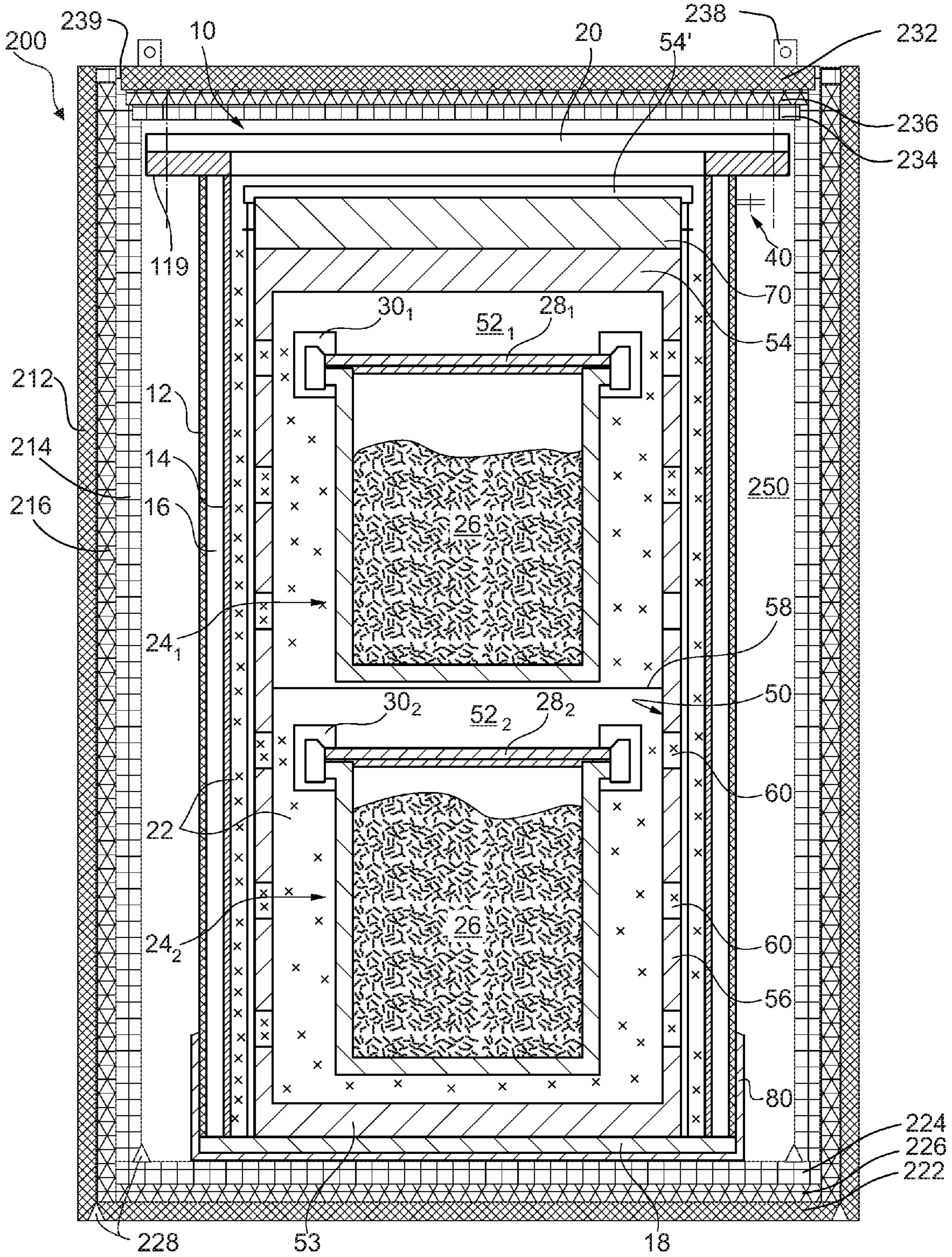
FIG. 1: is a sectional view of a first preferred embodiment of a radiation and impact-protected radioactive waste cask, comprising a radioactive waste storage container 10 and a removable outer transportation canister 200.
Figure 2:
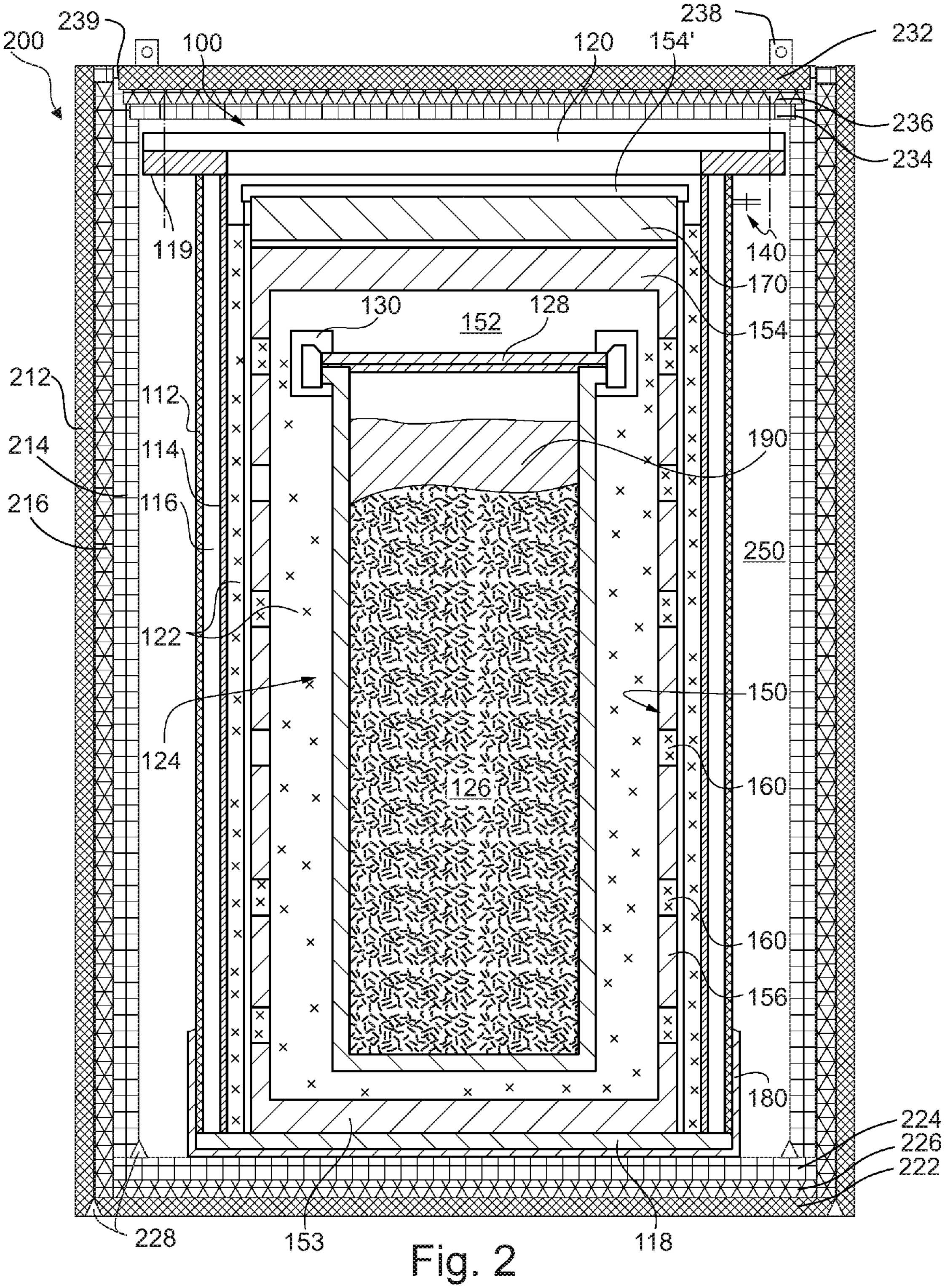
FIG. 2: is a sectional view of a second preferred embodiment of a radiation and impact-protected radioactive waste cask, comprising a radioactive waste storage container 100 and a removable outer transportation canister 200.

FIGS. 1 and 2 illustrate preferred embodiments radiation and impact-protected radioactive waste cask comprising a radioactive waste storage container 10, 100 further at least temporarily protected with a removable outer transportation canister 200.

FIG. 1 illustrates a container 10 for radioactive waste placed inside a removable outer transportation canister 200 according to a first embodiment of the disclosure. The container 10 for radioactive waste comprises a steel outer wall 12, a steel inner wall 14, a lead layer 16 contained between the two steel walls 12 and 14, a steel bottom 18, a steel lid 20, a volume 22 of quartz sand located inside the container and at least one inner vessel/cassette/inner box $\mathbf{24}_1$ and $\mathbf{24}_2$ coated encircled covered at least partially covered by the volume of quartz sand 22 (represented by crosses in the image). The radioactive waste 26 is located inside the vessel 24.

Internal wall 14, bottom 18 and lid 20 of the container 10 mean that once assembled, the inner wall, bottom 18 and lid 20 of the container form an inner envelope of waste insulation 26. This inner envelope defines an interior space in which the vessels $\mathbf{24}_1$ and $\mathbf{24}_2$ are housed with the waste 26 and quartz sand 22.

The steel bottom 18 is a wall receiving the vessel and the outer and inner walls 12 and 14, which extend from the bottom 18 to the lid 20, around the vessel $\mathbf{24}_1$ and $\mathbf{24}_2$. The bottom forms a circular outline, it can alternatively form an oval, square or any polygonal shape. The outer and inner peripheral walls and the lid may be of corresponding or different shape.

The inner and outer walls 12 and 14 may be made, for example, by welding two steel sheets preliminarily rounded. The inner and outer walls 12 and 14 are welded at their lower edge on the steel bottom 18. Molten lead or lead alloy is then preliminarily poured between the inner and outer walls to form the lead layer 16. In case of fusion, the lead layer 16 does not spread inside the container. Moreover, the bottom 18 may be flat or include particular shapes, for example for the positioning of the vessel/s $\mathbf{24}_1$ and $\mathbf{24}_2$.

The outer wall is of circular section with an outer diameter between 500 mm and 2000 mm. The container is, from a height between the bottom and the lid, between 800 mm and 5000 mm.

The inner and outer walls 12 and 14 are of a thickness of between 3 mm and 10 mm and the lead layer 16 has a thickness of between 25 mm and 50 mm.

The steel bottom 18 and the steel lid may be of a thickness equal to more than twice, for example three times the value of the thickness of the inner and outer walls 12 and 14.

The container 10 comprises a circular ring 19 for fixing the steel lid 20 and attached to the upper end of the outer and inner walls 12 and 14. The fixing ring 19 comprises holes for receiving bolts for fixing the lid passing through corresponding holes on the steel cover 20.

Quartz sand means silica sand with traces of different elements such as Al, Li, B, Fe, Mg, Ca, Ti, Rb, Na, OH. Quartz sand has the property of vitrifying after melting then hardening. Quartz sand with a low melting point will be chosen or appropriate fluxes, such as sodium carbonate, potassium carbonate, calcium oxide, etc., can be added to the quartz sand. The volume of glass thus formed can also block some of the radioactive radiation (for example with a premix of the quartz sand with a radiation absorbing material).

The outer wall 12 comprises a pressure relief valve 40. In addition to evacuation of gases emitted in case the lead layer 16 melts.

The container 10 further comprises racking means 50 or rack/display comprising one or more superimposed compartments $52_1$ and $52_2$ receiving the two vessels $24_1$ and $24_2$. The compartments each include a door (not shown) allowing easy access to the interior of the compartments.

The inner rack 50 comprises a bottom wall 53 in contact with the bottom 18 of the container 10, an upper wall 54, a cylindrical wall 56 extending between the lower and upper walls 53 and 54, and an intermediate wall 58 forming a bearing between the lower and upper walls 52 and 54.

The first vessel $24_1$ is positioned on the bottom wall 52 of the inner rack 50. The second vessel $24_2$ is deposited on the intermediate wall 58. The side wall 56 comprises several holes or orifices 60.

The inner rack 50 is positioned inside the container before the quartz sand. The holes 60 in the side wall 56 of the inner rack 50 allow for the transfer of quartz sand into compartments $52_1$ and $52_2$ in order to surround and call vessels $24_1$ and $24_2$. Depending on the arrangement of the holes in the inner rack 50, the sand may also cover the vessels $24_1$ and $24_2$. It is noted that the sand could also, preliminarily, be deposited under the vessel $24_1$. Alternatively, the inner rack 50 may comprise vertical/horizontal/diagonal mounts, and trays connected to the mounts; the quartz sand can thus surround/coat the vessels by passing through the mounts and trays.

The inner rack 50 is made of stainless steel. The inner rack 50 comprises a second upper wall 54' and a lead plate 70 positioned between the two upper walls 54 and 54'.

The inner vessels $24_1$ and $24_2$ include a removable cap $28_1$ and $28_2$ as well as means for securing/flanging/clipping/screwing $30_1$ and $30_2$ from the removable cap to the vessel $24_1$ and $24_2$.

The inner vessels $24_1$ and $24_2$ comprise centering means and/or one or more means for gripping/hooking/affixing eyelets (not shown), for example on the lid 20.

In this first mode of realization, the container 10 comprises two ceramic inner vessels $24_1$ and $24_2$, preferably made of ACA 997 type ceramic, more preferably of special ceramic ACS 99,8LS 172. The vessel $24_1$ and $24_2$ with its cap $28_1$ and $28_2$ has a height of between 250 mm and 300 mm. The vessel $24_1$ and $24_2$ has a capacity of between 10 L and 20 L and withstands temperatures up to 1400° C.

The waste 26 placed in the vessel $24_1$ and $24_2$ is highly radioactive. In particular, this mode of realization is intended for the storage of long-lived medium-to-high level radioactive waste, and in particular the non-recoverable final waste containing fission products and minor actinides, nuclear fuel ash.

What's more, the container 10 comprises an outer rubber/plastic/silicone envelope 80 covering the outer wall 12. The outer rubber envelope 80 is partially shown on the image at the lower zone of the container 10. The outer rubber envelope 80 is made by dipping the container 10 into a liquefied rubber bath. The outer envelope 80 will prevent degradation of the container by water.

FIG. 1 further shows a radioactive waste transport canister 200 wherein the container for radioactive waste 10 can be placed to further protect it from mechanical damage, especially during transport or against armed attacks. The radioactive waste transport canister 200 comprises a body; a bottom; and a cover; all comprising (at least) three layers, an outer layer 212, 222, 232; an inner layer 214, 224, 234; and an intermediate layer 216, 226, 236; wherein the outer layer 212, 222, 232 is made of armor grade steel, the inner layer 214, 224, 234 is made of high strength steel and an intermediate layer 216, 226, 236 is ceramic containing material, preferably composed of two or more strati, each comprising or consisting of ceramic material with a backing of a ductile fiber reinforced layer or a metal leaf, most preferably the ductile fibers are weaved para-aramid fibers. The respective steels are welded together as shown e.g. by welds 228 (other required welds are not necessarily shown).

The canister cover and the upper inner circumference of the canister body preferably are provided with complementary thread means 239 to allow for a sealing closure of the canister cover on the canister body. The canister cover or the canister body may be provided with means to facilitate, such as eyelets 238, closing the cover or transporting the whole radiation and impact-protected radioactive waste cask.

Advantageously, the inner dimension and shape of the radioactive waste transportation canister 200 are adapted to fittingly receive and hold in place the radioactive waste storage container 10 once it has been fully inserted. It might however be desirable to provide positioning blocks 240 (or similar) on the bottom (or the sides) of the radioactive waste transportation canister 200 not only to facilitate the correct positioning, but also to hold the container for radioactive waste 10 in place after insertion.

The void 250 may be filled up, entirely or in part with quartz sand to further enhance the resistance of the radiation and impact-protected radioactive waste cask against mechanical damage.

FIG. 2 illustrates a second preferred embodiment of a radiation and impact-protected radioactive waste cask, comprising a radioactive waste storage container 100 and a removable outer transportation canister 200. They will have in common the characteristics described in connection with FIG. 1's first embodiment. FIG. 2's reference numbers are similar to those used in FIG. 1 for the corresponding elements, these numbers being however increased by 100 for the second embodiment illustrated in FIG. 2. Reference numbers relating to the radioactive waste transport canister 200 are the same as in FIG. 1.

In this second embodiment, the container 100 comprises a single inner vessel 124. The inner vessel 124 is placed in a single compartment 152 of the inner rack 150. The inner vessel 124 is made of stainless steel. The inner vessel 124 with its cap 128 has a height of between 500 mm and 1000 mm. The inner vessel 124 has a capacity of between 50 L and 350 L.

The waste 126 located in the inner vessel 124 is faintly radioactive. For example, the waste constitutes metal structures of fuel elements, resulting from the operation of the reactor, used gloves, protective suits, irradiated tools, shells, connectors, radioactive mining residues that may pose problems of chemical toxicity if uranium is present with other otherwise toxic products such as lead, arsenic, mercury etc., the radioactive waste of the medical sector and whose half-life is less than 100 days.

In the embodiment of the disclosure presented here, the container 100 also comprises a plastic layer 190, preferably a low density polymer, covering the radioactive waste in the inner container 124. The plastic can be liquefied beforehand and mixed with a load and/or come from several low/high density polymers.

Similarly to FIG. 1, the second embodiment in FIG. 2 further shows a radioactive waste transport canister 200 to form a radiation and impact-protected radioactive waste cask, wherein the container for radioactive waste 100 can be placed to further protect it from mechanical damage, especially during transport or against armed attacks. The radioactive waste transport canister 200 is as described above.

What is claimed is:

1. A radiation and impact-protected radioactive waste cask comprising a container for radioactive waste, said container for radioactive waste comprising:

a steel outer wall;

a steel inner wall;

a layer of lead between the two steel walls;

a steel bottom;

a steel lid;

a volume of quartz sand inside the container at least one inner vessel coated at least partially with quartz sand, the quartz sand disposed between the steel inner wall and a vessel wall;

radioactive waste inside the vessel; and wherein the radiation and impact-protected radioactive waste cask further comprises:

a removable outer transportation canister, wherein the removable outer transportation canister comprises a hollow cylindrical or polygonal body with a lower end and an upper end, configured for fittingly receiving therein the container for radioactive waste, wherein the lower end is closed by a fixed bottom and the upper is closed with a removable canister cover, wherein the hollow cylindrical or polygonal body, the fixed bottom and the removable canister cover are made of at least three layers, an outer layer made of armor grade steel, an inner layer made of high strength steel, and an intermediate layer between said outer and inner layers, said intermediate layer being made of one or more strati comprising ceramic material, wherein said ceramic material is selected from oxide ceramics, non-oxide ceramics and mixtures thereof.

2. The radiation and impact-protected radioactive waste cask according to claim 1, wherein any void within the hollow cylindrical or polygonal body of the removable outer transportation canister and radioactive waste storage container is at least partially filled up with quartz sand.

3. The radiation and impact-protected radioactive waste cask according to claim 1, wherein the outer layer has a thickness of at least 15 mm.

4. The radiation and impact-protected radioactive waste cask according to claim 1, wherein the armor grade steel of the outer layer has a Brinell Hardness, HBW, of at least 3900 MPa according to ISO 6506-1:2014.

5. The radiation and impact-protected radioactive waste cask according to claim 1, wherein the inner layer has a thickness of at least 35 mm.

6. The radiation and impact-protected radioactive waste cask according to claim 1, wherein the high strength steel of the inner layer has a Brinell Hardness, HBW, of between 2450 and 3675 MPa according to ISO 6506-1:2014.

7. The radiation and impact-protected radioactive waste cask according to claim 1, wherein the intermediate layer has a thickness of at least 25 mm.

8. The radiation and impact-protected radioactive waste cask according to claim 1, wherein the intermediate layer comprises two or more strati comprising ceramic material with a backing of ductile fibers reinforced layer or a metal layer.

9. The radiation and impact-protected radioactive waste cask according to claim 1, wherein the intermediate layer comprises two or more strati comprising ceramic material with a backing of ductile fibers, wherein the ductile fibers are para-aramid fibers.

10. A method for protection of a container for radioactive waste from mechanical damage during transport and storage, thereby providing a radiation and impact-protected radioactive waste cask, wherein said container for radioactive waste comprises:

a steel outer wall;

a steel inner wall;

a layer of lead between the two steel walls;

a steel bottom;

a steel lid;

a volume of quartz sand inside the container at least one inner vessel coated at least partially with quartz sand, the quartz sand disposed between the steel inner wall and a vessel wall;

radioactive waste inside the vessel;

the method comprising providing an outer transportation canister comprising a hollow cylindrical or polygonal body with a lower end and an upper end, configured for fittingly receiving therein said container for radioactive waste, wherein the lower end is closed by a fixed bottom and the upper is closed with a removable canister cover, wherein the hollow cylindrical or polygonal body, the fixed bottom and the removable canister cover are made of at least three layers, an outer layer made of armor grade steel, an inner layer made of high strength steel, and an intermediate layer between said outer and inner layers, wherein said intermediate layer is made of one or more strati comprising ceramic material, wherein said ceramic material is selected from oxide ceramics, non-oxide ceramics and mixtures thereof;

placing the radioactive waste container inside said radioactive waste transportation canister, and sealing the radioactive waste transportation canister by firmly closing the canister cover.

11. The method according to claim 10, further comprising the step of filling up any void left within the radioactive waste transportation canister with quartz sand, before sealing the radioactive waste transportation canister by firmly closing the canister cover.

* * * * *